(12) United States Patent
Takahashi (10) Patent No.: US 6,489,625 B1
(45) Date of Patent: Dec. 3, 2002

(54) COORDINATE TRANSFORMING METHOD IN POSITION SETTING MEANS OF OBSERVATION DEVICE AND OBSERVATION DEVICE EQUIPPED WITH COORDINATE TRANSFORMING MEANS

(75) Inventor: Toshihiro Takahashi, Yaizu (JP)

(73) Assignee: Sapporo Breweries Ltd., Tokyo (JP)

( * ) Notice: Subject to any disclaimer, the term of this patent is extended or adjusted under 35 U.S.C. 154(b) by 0 days.

(21) Appl. No.: 09/700,721

(22) PCT Filed: Mar. 30, 2000

(86) PCT No.: PCT/JP00/02035

§ 371 (c)(1),
(2), (4) Date: Nov. 28, 2000

(87) PCT Pub. No.: WO00/58690

PCT Pub. Date: Oct. 5, 2000

(30) Foreign Application Priority Data

Mar. 31, 1999 (JP) .......................................... 11-093577

(51) Int. Cl.$^7$ ................................................. H01J 37/26
(52) U.S. Cl. ..................... 250/559.29; 250/307; 438/16
(58) Field of Search ..................... 250/559.29, 559.41, 250/307, 310, 491.1, 492.2; 437/8, 939; 438/16

(56) References Cited

U.S. PATENT DOCUMENTS 5,444,245 A * 8/1995 Kitamura ..................... 250/307
5,877,035 A * 3/1999 Fujino et al. .................. 438/16

FOREIGN PATENT DOCUMENTS

| EP | 0727660 A2 | * | 8/1996 |
| JP | 4-62858 | * | 2/1992 |
| JP | 06258240 A | * | 9/1994 |
| JP | 08220007 A | * | 8/1996 |
| JP | 10012686 A | * | 1/1998 |

* cited by examiner

*Primary Examiner*—Stephone B. Allen
(74) *Attorney, Agent, or Firm*—Oblon, Spivak, McClelland, Maier & Neustadt, P.C.

(57) ABSTRACT

The present invention allows a rapid and easy transformation of coordinates for position designation between first and second observation apparatus having means for designating positions in a sample. The present invention includes the steps of setting at least three observation points in random positions in the sample, setting the sample marked for determining the relative positions of the sample and a sample base on the first and second observation apparatus so as to read the coordinates of the above-mentioned observation points, and determining coordinate transformation formulas by calculating a, b, c, and d of below-described formulas (1) by letting one of the above-mentioned three observation points serve as temporary origins, correcting the coordinates of the other two based on the above-mentioned temporary origins, and substituting the corrected coordinates into the formulas (1).

$$Xn=aXn+bYn, \quad yn=cXn+dYn \qquad (1)$$

4 Claims, 7 Drawing Sheets

FIG. 2

|   | 1 | 2 | 3 | 4 | 5 | · · |
|---|---|---|---|---|---|---|
| 1 | 0 | 0 | 0 | 0 | 0 | |
| 2 | 0 | 1 | 1 | 0 | 1 | |
| 3 | 0 | 1 | 0 | 0 | 0 | |
| 4 | 0 | 0 | 0 | 0 | 1 | |

2) SFDS

• (X1, Y1)

• (X0, Y0)

• (X2, Y2)

1) RMDS

| SAMPLE | (a) RMDS MEASURED COORDINATES | | (b) RMDS CORRECTED COORDINATES | | (c) MICROSCANNER ESTIMATED CORRECTED COORDINATES | | (d) MICROSCANNER ESTIMATED COORDINATES | | (e) MICROSCANNER MEASURED COORDINATES | | (f) ERROR (mm) | |
|---|---|---|---|---|---|---|---|---|---|---|---|---|
| | x3 | y3 | x3r | y3r | X3sr | Y3sr | X3s | Y3s | X3 | Y3 | X3−X3s | Y3−Y3s |
| 1 | 126 | 220 | −100 | 126 | −9.88 | 12.94 | 25.08 | 25.57 | 26.11 | 25.31 | 1.03 | −0.26 |
| 2 | 162 | 212 | −64 | 118 | −6.32 | 12.06 | 28.64 | 24.69 | 28.96 | 25.22 | 0.32 | 0.53 |
| 3 | 164 | 252 | −62 | 158 | −6.11 | 16.09 | 28.85 | 28.72 | 29.76 | 28.73 | 0.91 | 0.01 |
| 4 | 230 | 240 | 4 | 146 | 0.42 | 14.74 | 35.38 | 27.37 | 35.07 | 26.87 | −0.31 | −0.50 |
| 5 | 252 | 294 | 26 | 200 | 2.61 | 20.16 | 37.57 | 32.79 | 37.17 | 32.50 | −0.40 | −0.29 |
| 6 | 270 | 206 | 44 | 112 | 4.38 | 11.23 | 39.34 | 23.86 | 39.24 | 23.81 | −0.10 | −0.05 |
| 7 | 278 | 240 | 52 | 146 | 5.18 | 14.65 | 40.14 | 27.28 | 40.33 | 26.91 | 0.19 | −0.37 |
| 8 | 302 | 236 | 76 | 142 | 7.55 | 14.19 | 42.51 | 26.82 | 43.75 | 27.21 | 1.24 | 0.39 |
| 9 | 308 | 334 | 82 | 240 | 8.16 | 24.08 | 43.12 | 36.71 | 44.52 | 37.11 | 1.40 | 0.40 |
| 10 | 336 | 272 | 110 | 178 | 10.92 | 17.76 | 45.88 | 30.39 | 45.91 | 30.38 | 0.03 | −0.01 |
| 11 | 344 | 178 | 118 | 84 | 11.70 | 8.24 | 46.66 | 20.87 | 46.78 | 21.04 | 0.12 | 0.17 |
| 12 | 323 | 138 | 97 | 44 | 9.61 | 4.24 | 44.57 | 16.87 | 44.71 | 16.97 | 0.14 | 0.10 |
| 13 | 344 | 138 | 118 | 44 | 11.69 | 4.20 | 46.65 | 16.83 | 46.66 | 16.88 | 0.01 | 0.05 |

COORDINATE TRANSFORMING METHOD IN POSITION SETTING MEANS OF OBSERVATION DEVICE AND OBSERVATION DEVICE EQUIPPED WITH COORDINATE TRANSFORMING MEANS

TECHNICAL FIELD

The present invention relates to a coordinate determination method of an observation apparatus, such as a microscope with an automatic sweep unit, having its own coordinates determined within an observation range so that an object to be observed can be positioned and observed at any of the coordinates, and more particularly to a coordinate determination method by which a specified position in a sample which position is observed by an apparatus A and checked using the coordinates of the apparatus A can be determined easily in an apparatus B having coordinates different from those of the apparatus A when the same sample is observed by the different observation apparatus having their respective own coordinates.

BACKGROUND ART

A rapid microorganism detection system using an ATP-luciferase method, for example, observes the presence of microorganisms by causing a luciferin-luciferase reaction using adenosine triphosphate (ATP), which exists peculiarly in a mass in a living cell, so as to detect faint luminescence generated in proportion to the content of ATP by means of a photodetector. This state of luminescence is imaged by means of an image acquisition unit such as a charge coupled device (CCD) so as to be visually observed. However, according to this method, although the presence of the microorganisms can be observed to a slight extent, the kinds of the observed microorganisms cannot be recognized.

Therefore, in order to accurately specify the microorganisms whose presence is observed by the above-described method, it is necessary to observe a sample used in the above-described method by a microscope. In order to make these two observations skillfully and efficiently, it is important to specify, with ease in a short time, positions at which the microorganisms exist in the sample and designate the positions by means of an automatic sweep unit for examination position provided to the microscope so that the objective microorganisms can be observed immediately.

However, when the sample is checked by the above-described rapid microorganism detection system (hereinafter referred to as an RMDS) and further observed by the microscope with the automatic sweep unit (hereinafter referred to as an SFDS), the coordinates of the RMDS, as they are, cannot be used as those of the SFDS. Therefore, the microscope separately requires an adjustment, thus forcibly requiring time and complicated operations.

In other words, the coordinates of the RMDS and the SFDS do not have a direct correlation, and the respective units of the coordinate axes thereof do not have any correlation, not to mention the origins thereof. (For example, the coordinate axes provided for the RMDS for position confirmation employs as a scale unit one pixel of an image acquisition unit employed. On the other hand, the scale unit of the coordinate axes provided for the sweep unit of the SFDS is millimeters.) For example, if a sample of the RMDS were a filter 47 mm in diameter, on which filter an enzyme of one cell exists, it would be necessary to observe a visual field of 3,000 with a magnification of 100 and that of 6,000 with a magnification of 200 when the sample is observed by the microscope. However, practically, the observations cannot be made in this way. (In this case, the areas of the visual fields of the respective magnifications would be 0.76×0.76 mm and 0.53×0.53 mm.)

This problem is not limited to the usages of the RMDDS and the SFDS, but is in common with the usages of observation apparatus having means for determining their own coordinates within observation ranges and for indicating and designating the specified positions of objects to be observed by means of the coordinates.

The present invention eliminates the above-described conventional disadvantages, and the object thereof is to obtain a coordinate transformation method in which a correlation is established between the coordinates of observation apparatus having their respective coordinates for position designation so that a position in one observation apparatus is specified based on position data from the other when the same sample is observed by the observation apparatus.

DISCLOSURE OF THE INVENTION

The present invention is made in the light of the above-described disadvantages and eliminates the disadvantages by adopting the following processes.

In other words, the present invention is a method of transforming a first coordinate system for position designation of a first observation apparatus into a second coordinate system for position designation of a second observation apparatus. The first and second coordinate systems are different from each other. The present invention is characterized by adopting the following processes.

(1) Preparing a sample for coordinate determination in which sample at least three observation points are set in random positions.

(2) Placing the sample on the sample base of the first observation apparatus to observe the above-mentioned observation points and read the coordinates thereof ((X1, Y1), (X2, Y2), and (X3, Y3)).

(3) Marking randomly the sample and the sample base so as to determine the relative positions thereof.

(4) Removing the sample from the first observation apparatus and setting the sample in the second observation apparatus. Putting randomly a mark on a holding unit (for example, a slide glass) for holding the sample so that the mark corresponds to the marked position in the sample when the sample is placed on the sample base (including the original coordinates of the second observation apparatus) or the sample holding unit of the second observation apparatus. Setting the sample in the second observation apparatus so that the marked position in the sample corresponds to the mark. Hereafter, setting the sample so that the marked position corresponds to the mark whenever the sample is observed by the second observation apparatus after being observed by the first observation apparatus.

(5) Reading the coordinates ((x1, y1), (x2, y2), and (x3, y3)) of the positions of the observation points set in the sample by using the original coordinates of the second observation apparatus.

(6) Letting one of the above-described observation points serve as temporary origins (for example, (x1, y1) and (X1, Y1)).

(7) Calculating a, b, c, and d of coordinate transformation formulas $xn = aXn + bYn$ and $yn = cXn + dYn$ by substituting the coordinates of the other two observation points into the above-described formulas. Substituting obtained values into the above-described formulas to determine the coordinate transformation formulas. Correcting the values of xn, yn, Xn, and Yn to be substituted thereinto to values based on the respective temporary origins (to give a correlation).

(8) Correcting the determined transformation formulas so that the determined transformation formulas are adapted to the original coordinate system of the second observation apparatus (correcting the first coordinate system based on the temporary origin thereof to the original coordinate system of the second observation apparatus) (xn=aXn+bYn+x1 and yn=cXn+dYn+y1).

(9) Observing the sample by the first observation apparatus and reading the value of an observation point in the sample ((X4, Y4).) . . . ).

(10) Calculating (x4, y4) by substituting the value confirmed in the process (9) into the coordinate transformation formulas determined in the process (8).

(11) Moving the sample to the second observation apparatus and inputting the value of the above-mentioned coordinates to the position determination means (a sweep unit) thereof so as to designate a position.

Through the above-described processes, the coordinates of the observation points in the sample confirmed by the first observation apparatus can be transformed into the coordinates of the observation points in the second observation apparatus. Further, by providing the second observation apparatus with the above-described coordinate transformation function, the coordinates of the observation points confirmed by the first observation apparatus, as they are, can be used to designate positions in the second observation apparatus.

Moreover, the observation apparatus according to the present invention is characterized by having a position determination means including a first coordinate system, which means includes a coordinate transformation means for transforming a second coordinate system of the position determination means of another observation apparatus into the first coordinate system, which is different from the second coordinate system.

According to the observation apparatus of the present invention, a coordinate value confirmed by another observation apparatus is directly input to the observation apparatus of the present invention to be transformed into an original coordinate value thereof and output to the position determination means thereof.

BEST MODE FOR CARRYING OUT THE INVENTION

Next, a description will be given, with reference to the accompanying drawings, of an embodiment of the present invention.

In this embodiment, the description will be given by taking the case in which a rapid microorganism detection system (RDMS) using the ATP-luciferase method, which is effective in confirming the presence of microorganisms, is a first observation apparatus, and a microscope with an automatic sweep unit (SFDS), which is effective in confirming the details of the microorganisms, is a second observation apparatus.

First, a description will be given of the outlines of the rapid microorganism detection system (RDMS) and the microscope with the automatic sweep unit (SFDS).

According to the examination of microorganisms made by the RDMS, a specimen liquid is first filtered so as to isolate live cells on a filter, and the filter is detected by means of a microbial luminescence image analyzing system. According to the system, the filter, on which the live cells are isolated, is processed with an extractant and a luminescent reagent, and is set on a specimen holder. Then, a television camera including an optical system and an image acquisition unit such as a charge coupled device is set as closely to the filter as possible in order to acquire the image of the state of luminescence of the filter. Data for the acquired image is shown on a display for observation through an image processing device and a data-analyzing device, and the results of the analysis are printed out.

Figure 1:
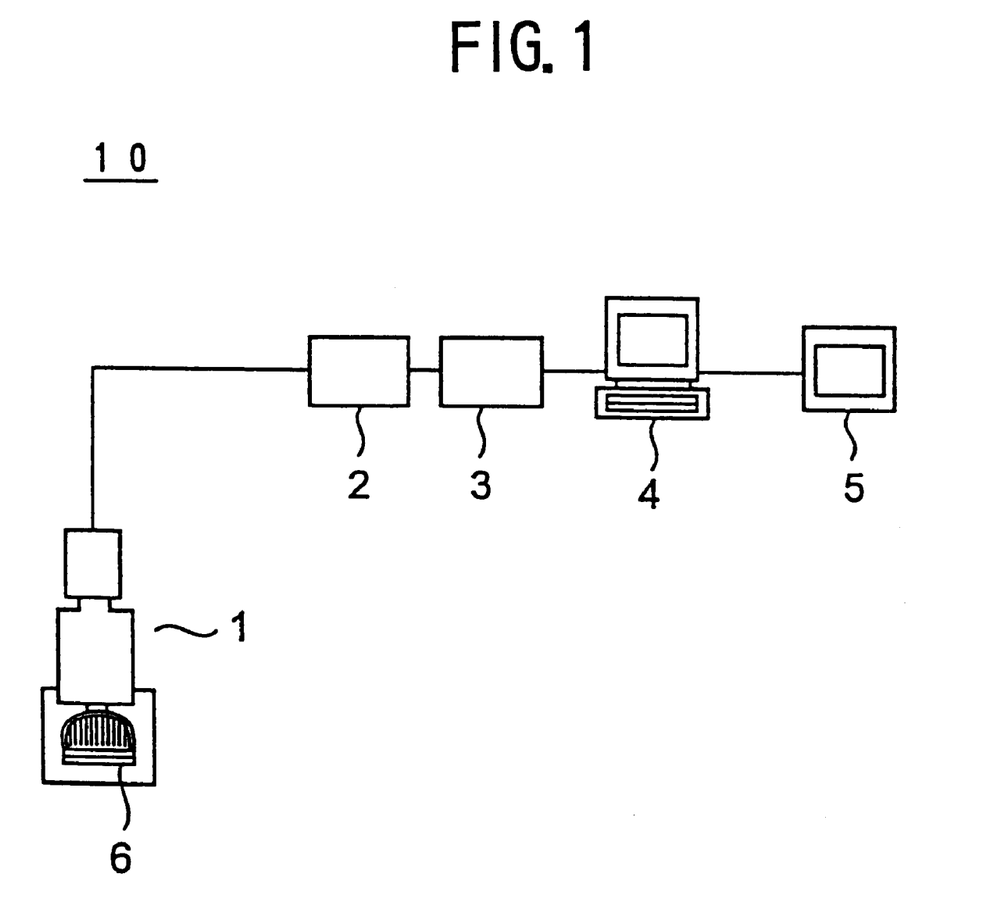
FIG. 1 is a diagram showing a structure of a rapid microorganism detection system.
Figure 2:
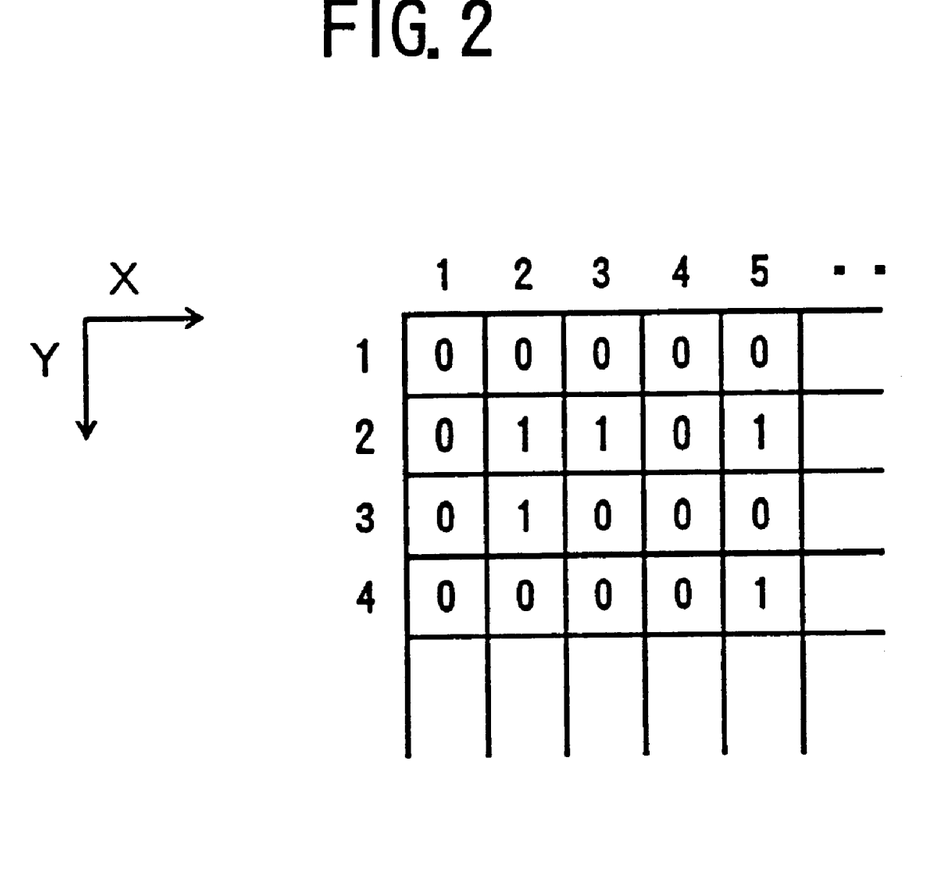
FIG. 2 is a diagram illustrating coordinates employing a pixel of a camera tube as its unit in an image of the rapid microorganism detection system.

FIG. 1 is a schematic diagram of a system of a rapid microorganisms detection system (RDMS) 10, which includes a high-sensitivity television camera 1 including a tapered fiber, an optical amplifier section and a camera tube (a charge coupled device), a camera controller 2, an image processor 3, a data-analyzing device 4 and a television monitor 5. The measurement is made as follows: A filter 6 holding the live cells subjected to luminescence treatment is set closely to the high-sensitivity television camera 1. The image of luminescence from the live cells is acquired by accumulating two-dimensional photons for a predetermined period of time, for example, 30 to 180 seconds, using the camera controller 2 and the image processor 3. Luminescence noises are erased by the data-analyzing device 4, so that only intense luminescence from the live cells remains to be displayed on the television monitor 5. This process erases, as noise, luminescence other than that from the live cells, and the number of measured luminous points becomes the number of the live cells. The luminous points originating in the microorganisms, for example, as shown in FIG. 2, can be shown by means of coordinates using a pixel of the camera tube as its unit (in FIG. 2, "1"s indicate the luminous points originating in the microorganisms), and the luminous points can be confirmed using the positions in the filter 6 by relating the positions in the filter 6 with those in the camera tube.

Next, a description will be given of the outline of the microscope with the automatic sweep unit (SFDS).

Figure 3:
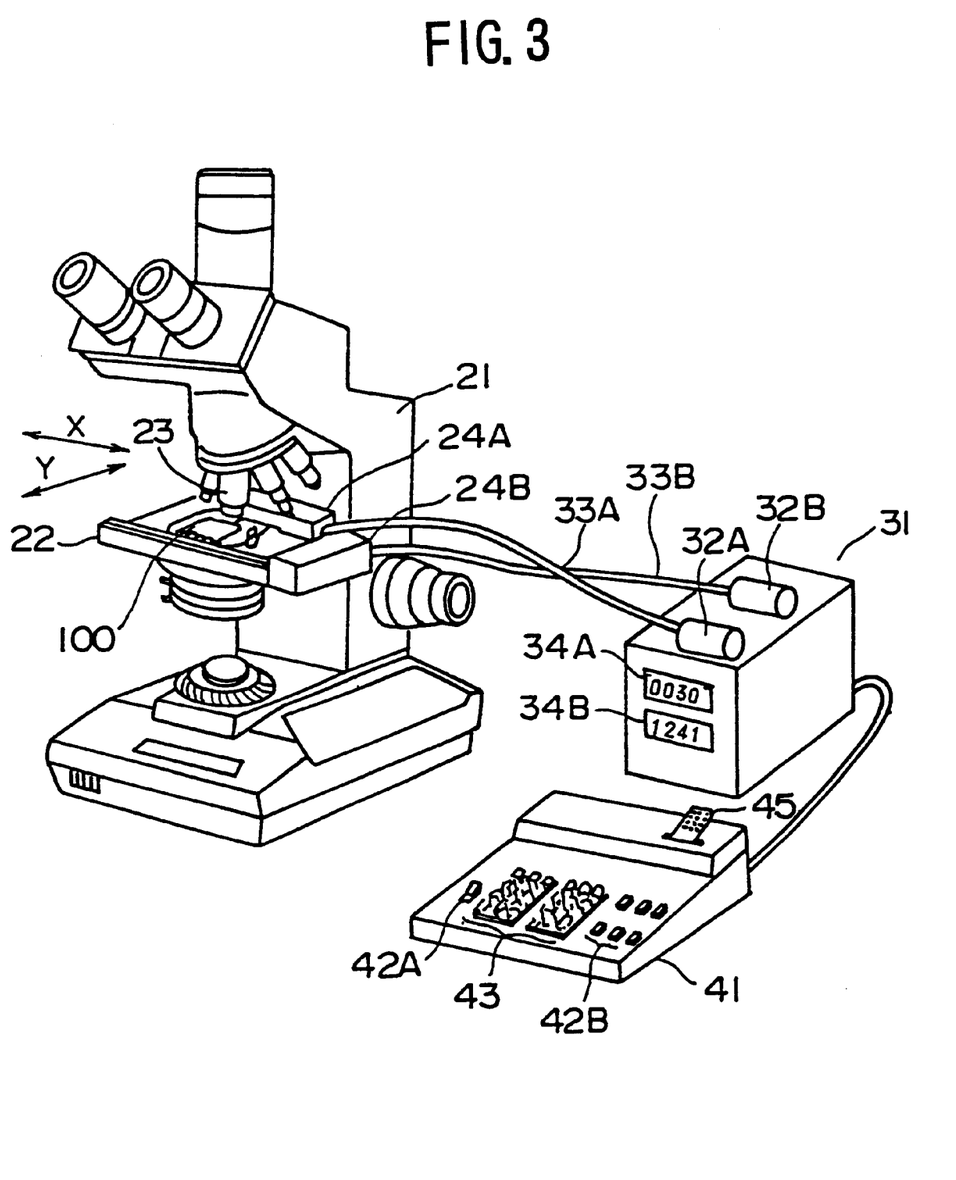
FIG. 3 is a diagram showing a system structure of a microscope with an automatic sweep unit.

FIG. 3 is a schematic diagram of a structure of an SFDS 20, which includes a microscope 21, a control box 31 for controlling a position of a holder for holding a slide glass, and an operation panel 41 for inputting necessary data to the control box 31 and outputting the examination results by the microscope.

The microscope 21 includes a stage 22 for supporting a sample filter 100 and x-axis and y-axis moving mechanisms 24A and 24B. The x-axis and y-axis moving mechanisms 24A and 24B, which are provided to the stage 22, move the filter 100 in directions indicated by arrows x and y, respectively, under objective lenses 23.

The control box 31 includes x-axis and y-axis drive motors 32A and 32B for driving the x-axis and y-axis moving mechanisms 24A and 24B of the microscope 21, respectively, and display units 34A and 34B indicating positions of the filter 100 in x-axial and y-axial directions, respectively. The drive forces of the x-axis and y-axis drive motors 32A and 32B are transmitted to the x-axis and y-axis moving mechanisms 24A and 24B via flexible axes 33A and 33B, respectively.

The operation panel 41 includes a power supply switch 42A, a group of switches 42B for other operations, and a group of input switches 43 for inputting a variety of data for designating positions to which the filter 100 is moved. In addition to switches for inputting coordinate data for designating the positions to which the filter 100 is moved, the group of the input switches 43 includes a coordinate switching switch (not shown) which switches a coordinate system for inputting coordinates from an RMDS mode to an FSDS mode. The operation panel 41 further includes an output device 45 so that a specified one of the positions of the filter can be not only stored but also printed out from the output device 45.

Figure 4:
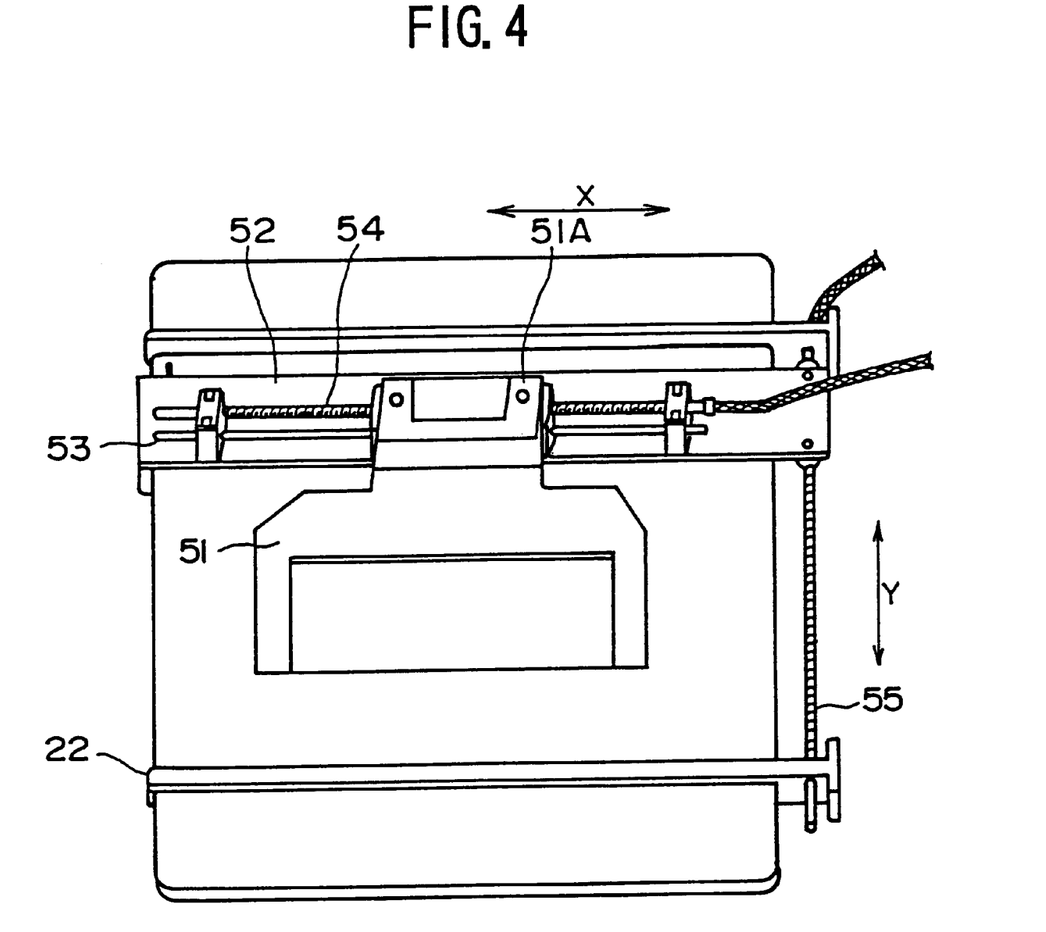
FIG. 4 is a diagram illustrating a mechanism for moving a sample stage of the microscope with the automatic sweep unit.

FIG. 4 shows details of the respective x-axis and y-axis moving mechanisms 24A and 24B for moving the filter 100. The mechanisms 24A and 24B are provided to the stage 22 of the microscope 21.

The stage 22 includes a holder 51 for holding the filter. The holder 51 is movably supported in X directions in FIG. 4 by a guide shaft 53, which is attached to a movable plate 52 through an attachment portion 51A of the holder 51. The attachment portion 51A includes a threaded hole through which a screw 54 penetrates. The screw 54 is rotated by the above-described drive motor 32A so that the holder 51 is moved in the X directions.

On the other hand, the movable plate 52 is movably supported in Y directions in FIG. 4 with respect to the stage 22. A screw 55 penetrates through an edge portion of the movable plate 52. The screw 55 is rotated by the drive motor 32B so that the movable plate 52 is moved in the Y directions.

Figure 5:
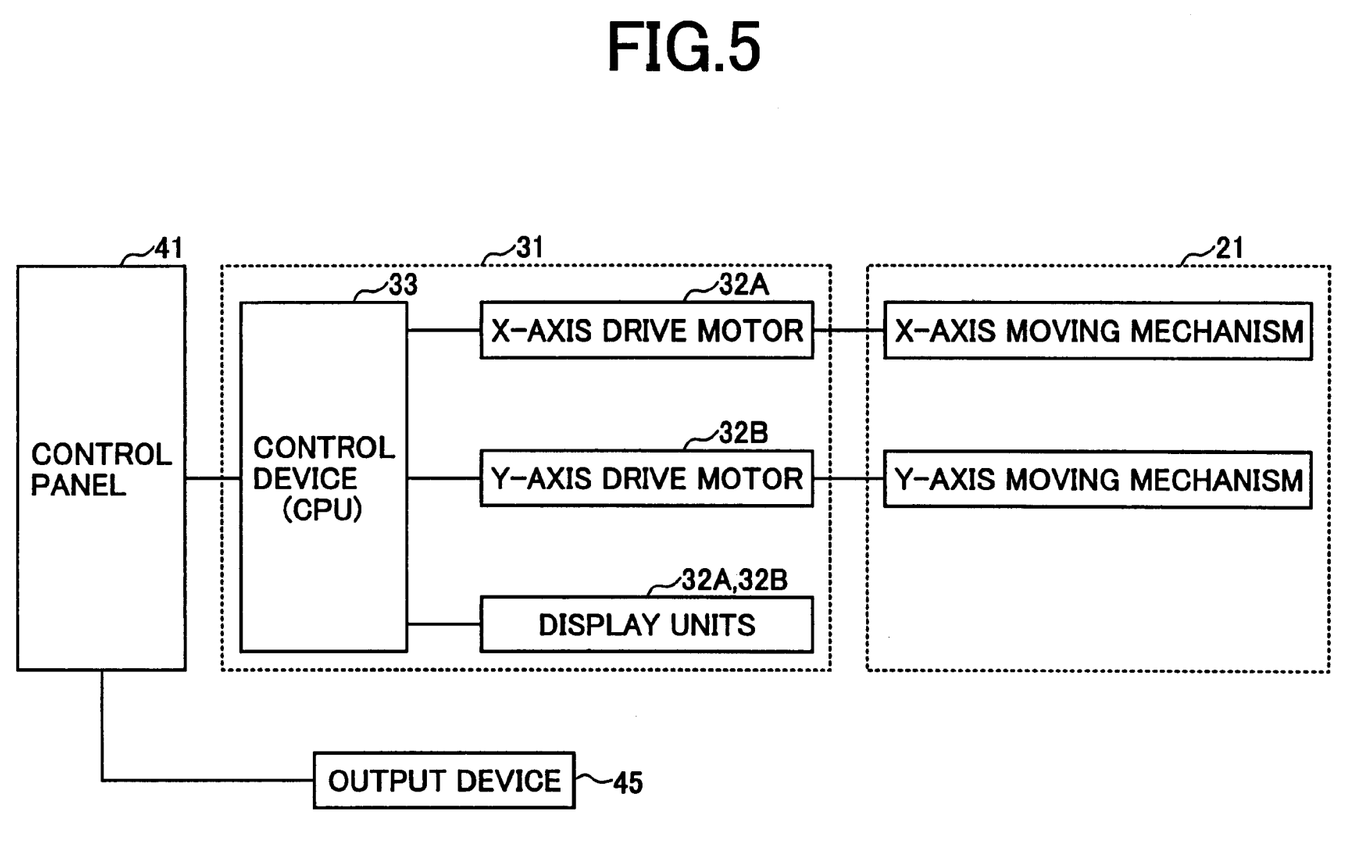
FIG. 5 is a block diagram illustrating a control device of the microscope with an automatic sweep unit.

FIG. 5 is a block diagram showing a control system of the operation of the SFDS 20. The control box 31 includes a control device 33 and performs a variety of operations based on input signals from the switches of the operation panel 41 so as to output a control signal to the x-axis and y-axis drive motors 32A and 32B and required data to the output device 43 of the operation panel 41.

In the case of making an observation using the SFDS 20 having the above-described structure, after placing the prepared sample filter on the holder 51 provided on the stage 22 of the microscope 21, the holder 51 is moved so that a required position in the sample filter can be observed by inputting the coordinates through the input switches 43 of the operation panel 41. If there are observation points to be recorded present during the observation, the coordinates of the observation points are stored by operating a required one of the switches 42. After the observation is over, the stored coordinates are printed out from the output device 45 as required.

The SFDS according to this embodiment further includes a function to transform directly input coordinates of the RMDS into coordinates of the SFDS so that the coordinates of the SFDS do not have to be input in the case of inputting coordinates to determine positions to which the holder 51 is moved. In other words, the control device 33 of the control box 31 contains a program for performing a later-described operation for transforming coordinates of the RMDS input from the operation panel 41 into coordinates of the SFDS. Therefore, by switching the coordinate switching switch of the input switches 43 to the RMDS mode, the control device 33 automatically transforms coordinates of the RMDS input directly from the input switches 43 into coordinates of the SFDS through the operation using predetermined transformation formulas.

Coordinate Transformation

Figure 6:
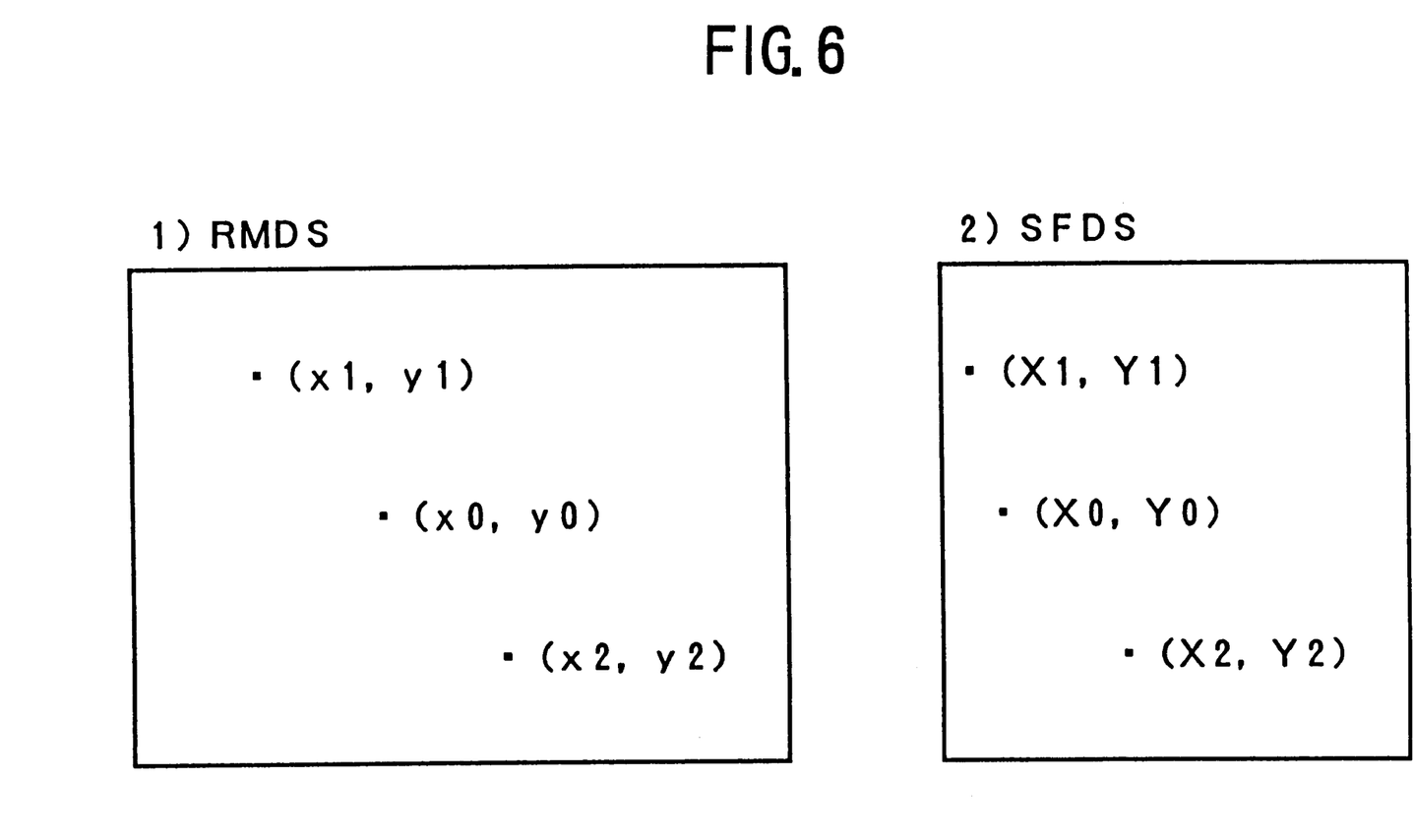
FIG. 6 illustrates coordinate systems of the RMDS and the SFDS.

Next, a description will be given of processes of transforming the coordinate system of the filter image obtained by the RMDS into the coordinate system of the SFDS. FIG. 6 shows 1) the RMDS coordinate system and 2) the SFDS coordinate system.

(1) Preparing a sample for coordinate determination by mixing an ATP solution with a pigment and dropping the ATP solution into spots on the filter.

(2) Marking correspondingly a random position in the sample and a random position in the sample base of the RMDS when the sample is placed on the sample base, and confirming, by the RMDS, the coordinates (x, y) of luminous points produced by dropping the above-described ATP solution into the spots.

(3) Setting the filter on the SFDS. Putting a mark on the sample base of the SFDS or on the sample holding unit thereof and placing the filter so that the marked position in the above-mentioned filter corresponds to the above-described mark. Recording coordinates (X, Y) at which the pigment of the spots formed on the filter is brought within the visual field of the microscope.

(4) Observing at least three different spots in this operation to obtain their respective coordinates, and letting one of the three spots serve as temporary origins ((x0, y0) and (X0, Y0)) and the other two be coordinates ((x1, y1) and (X1, Y1)) and ((x2, y2) and (X2, Y2)) for making the transformation formulas.

(5) Substituting the coordinates ((x1, y1) and (X1, Y1)) and ((x2, y2) and (X2, Y2)) into the following formula (1) to obtain formulas (2).

The coordinates ((x, y) and (X, Y)) to be substituted are always relative values to the respective temporary origins ((x0, y0) and (X0, Y0)). Therefore, it is necessary to subtract the coordinate values of (x0, y0) and (X0, Y0) from the respective coordinate values.

$$\begin{pmatrix} X \\ Y \end{pmatrix} = \begin{pmatrix} a & b \\ c & d \end{pmatrix} \begin{pmatrix} X \\ Y \end{pmatrix} \tag{1}$$

$$\left.\begin{array}{l} X1 = a \cdot x1 + b \cdot y1 \\ Y1 = c \cdot x1 + d \cdot y1 \\ X2 = a \cdot x2 + b \cdot y2 \\ Y2 = c \cdot x2 + d \cdot y2 \end{array}\right\} \tag{2}$$

(6) Finding a, b, c, and d from the following formulas (3) to determine transformation formulas (4).

$$\left.\begin{aligned}&a = (X1 - b \cdot y1)/x1 \\ &c = (Y1 - d \cdot y1)/x1 \\ &X2 = \{(X1 - b \cdot y1)/x1\} \cdot x2 + b \cdot y2 \\ &b = \{X2 - X1 \cdot x2/x1\}/\{-y1 \cdot x2/x1 + y2\} \\ &Y2 = \{(Y1 - d \cdot y1)/x1\} \cdot x2 + d \cdot y2 \\ &d = \{Y2 - Y1 \cdot x2/x1\}/\{-y1 \cdot x2/x1 + y2\}\end{aligned}\right\} \quad (3)$$

(7) RMDS coordinates (x3, y3) can be transformed into SFDS coordinates (X3, Y3) by substituting the coordinates (x3, y3) into the following formulas (4).

In this case, the coordinates (x3, y3) are corrected to a value based on the temporary origin of the RMDS coordinates, and the coordinates (X3, Y3) obtained by the calculation are corrected to a value based on the temporary origin of the SFDS coordinates (by adding the temporary origin (X0, Y0) thereto).

$$\left.\begin{aligned}&X3 = a \cdot x3 + b \cdot y3 \\ &Y3 = c \cdot x3 + d \cdot y3\end{aligned}\right\} \quad (4)$$

Embodiment

Next, a description will be given of an embodiment in which the transformation formulas are obtained by using specific values of the coordinates of the RMDS and the SFDS.

(1) First, with respect to three selected spots on the filter, measured values shown in TABLE 1 are obtained according to the above-described processes (1) through (3). Among those three spots, a temporary origin corresponds to points (226, 94) and (34.96, 12.63), and the other two spots are taken as points for determining the transformation formulas.

TABLE 1

|  | x | y | X | Y |
|---|---|---|---|---|
| Temporary origin | 226 | 94 | 34.96 | 12.63 |
| Point 1 | 386 | 134 | 50.81 | 16.34 |
| Point 2 | 235 | 255 | 35.88 | 28.88 |

(2) Next, the measured values of the respective coordinates are expressed as relative values to the respective temporary origins as shown in TABLE 2 according to the above-described process (4). The units of the RMDS and SFDS coordinate systems are a pixel and millimeters, respectively.

TABLE 2

| x1 | y1 | X1 | Y1 |
|---|---|---|---|
| 160 | 40 | 15.85 | 3.71 |
| x2 | y2 | X2 | Y2 |
| 9 | 161 | 0.92 | 16.25 |
| a | b | c | d |
| 0.099018 | 0.000179 | −0.00207 | 0.101048 |

(3) The coefficients a, b, c, and d are obtained according to the above-described process (6) by using the coordinate values of ((x1, y1) and (X1, Y1)) and ((x2, y2) and (X2, Y2)) shown in TABLE 2. The results are as shown in TABLE 2.

(4) According to the above-described results, the transformation formulas by which the RMDS coordinates (x3, y3) are transformed into the SFDS coordinates (X3, Y3) become as follows.

$X3 = 0.099018\ x3 + 0.000179\ y3$ $Y3 = -0.00207\ x3 + 0.101048\ y3$

Experiment

Next, a description will be given of an experiment conducted to examine the accuracy of the coordinate transformation by the above-described formulas.

(1) Filtration was performed with ten yeasts or so added to the filter.

Figure 7:
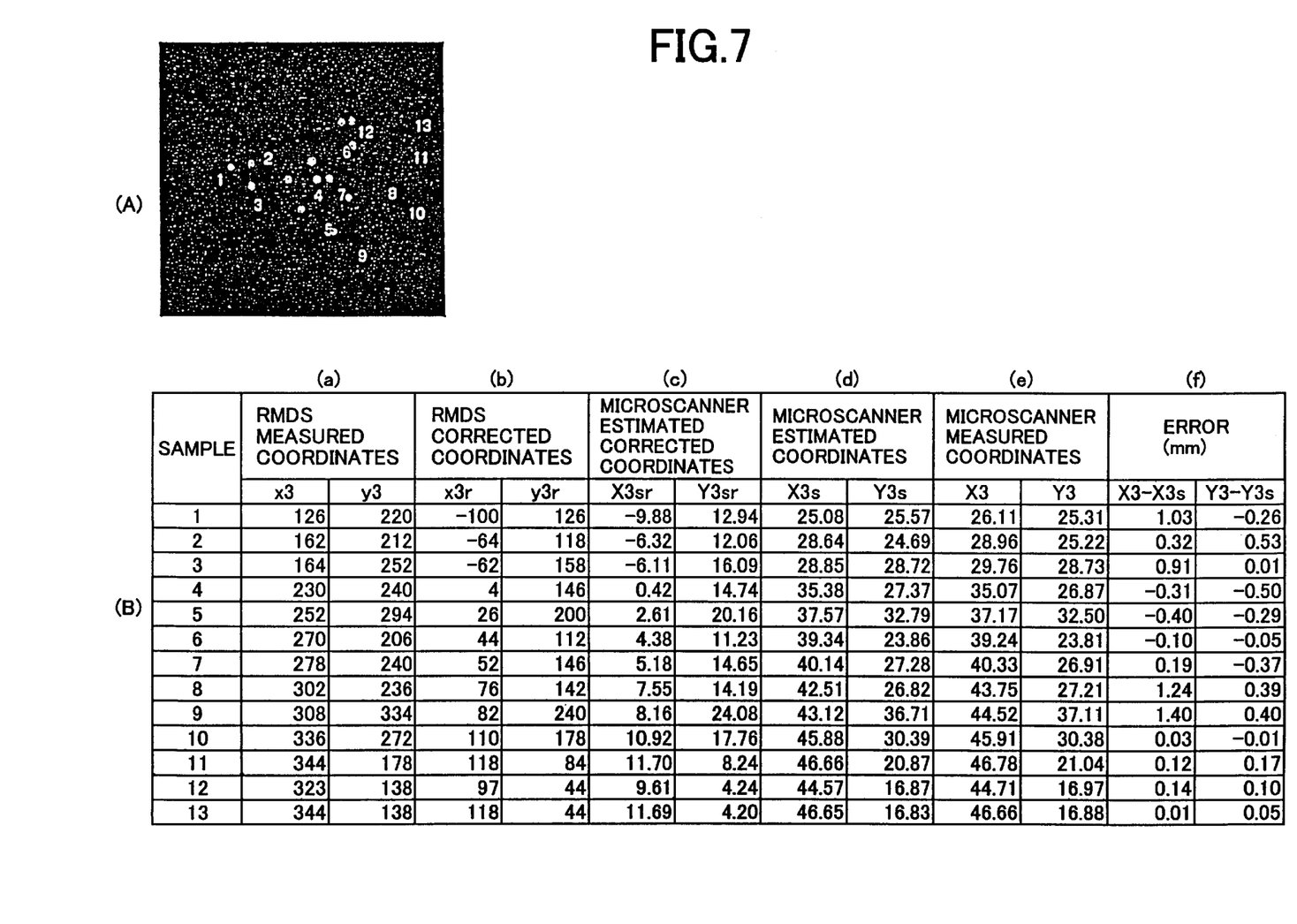
FIG. 7 shows an experiment of a transformation of the RMDS coordinate system into the SFDS coordinate system.

(2) The filter was examined and observed by the RMDS so that image data shown in FIG. 7(A) was obtained.

(3) The coordinates of luminous points generated in the RMDS were measured (FIG. 7(B), (a)).

(4) Relative coordinates (b) were obtained from the measured values (a) based on the coordinates of a temporary origin.

(5) The corrected estimated coordinates of the SFDS (c) were obtained by the coordinate transformation formulas.

(6) The estimated coordinates of the SFDS (e) were obtained by adding the coordinate value of a temporary origin to the corrected estimated coordinates.

(7) The filter was stained with acridine orange so that the surroundings of the measured points were observed by a fluorescence microscope having a magnification of 200. As a result, yeast-like matters were observed at the coordinates (e).

(8) The accuracy of the coordinate transformation formulas was evaluated by calculating differences (f) between the estimated values (d) and the measured values (e).

As shown in the evaluation results, the maximum errors were 1.6 mm and 0.53 mm with respect to the x-axial and y-axial directions, respectively. In other words, the luminous points generated in the RMDS can be observed by observing the visual field of the range of ±1.6×10.5 mm of the entire surface of the filter (whose diameter is 47 mm).

The embodiment of the present invention has been described above with reference to the case in which the sample filter is moved for observation between the two different observation apparatus, that is, from the rapid microorganism detection system to the microscope with the automatic sweep unit. However, observation apparatus are not necessarily limited to the above-described two types, and it will be apparent that the present invention can be applied to any observation apparatus between which a sample is moved if the apparatus have their respective coordinate systems different from each other.

As described above, according to the present invention, in the case of observing a sample by two observation apparatus having their respective different coordinate systems for position designation, a position in the sample, which position is confirmed by one of the observation apparatus, can be accessed easily by the other for the observation thereof. This allows rapid observations by the two observation apparatus.

What is claimed is:

1. A method of coordinate transformation, the method being employed in position determination units of first and second observation apparatus, comprising:

(a) reading coordinates of three observation points set in random positions in a sample for coordinate determination, the sample being placed on a sample base of the first observation apparatus and marked for determining relative positions of the sample and the sample base;

(b) reading the coordinates of the observation points by using original coordinates of the second observation apparatus, in which the sample is set after being removed from the first observation apparatus;

(c) determining coordinate transformation formulas by calculating a, b, c, and d of formulas (1) constituting:

$$xn=aXn+bYn$$

$$yn=cXn+dYn$$

by letting one of the observation points serve as temporary origins, correcting the other two to coordinates based on the respective temporary origins, and substituting the coordinates into the formulas (1); and (d) transforming coordinates of the first observation apparatus into coordinates of the second observation apparatus by correcting a value obtained by substituting the coordinates of the first observation apparatus into the above-described determined transformation formulas, the value being corrected based on coordinates of the temporary origin of the second observation apparatus.

2. An observation apparatus comprising:

a first position determination unit having a first coordinate system for specifying an observation position by coordinates, said first position determination unit including a coordinate transformation unit that transforms a second coordinate system of a second position determination unit of another observation apparatus into the first coordinate system that is different from the second coordinate system, said coordinate transformation unit including:

a) means for setting at least three observation points at random positions in the first coordinate system, reading observation points of a sample that is marked for determining relative positions of the sample and a sample base, using an arbitrary one of the observation points as a temporary origin of the second coordinate system and correcting coordinates of other observation points with reference to the temporary origin, and calculating coefficients a, b, c and d of formulas:

$$xn=aXn+bYn$$

$$yn=cXn+dYn$$

to determine coordinate transformation formulas;

wherein:
Xn and Yn denote coordinates in the first coordinate system; and
xn and yn denote coordinates in the second coordinate system; and b) means for transforming coordinates of the first coordinate system into coordinates of the second coordinate system by substituting the coordinates of the first coordinate system into said coordinate transformation formulas and correcting values obtained thereby based on the temporary origin.

3. A coordinate transformation method used in position determination units of first and second observation apparatuses, the method comprising:

(a) reading coordinates of at least three observation points set at random positions in a sample that is placed on a sample base of the first observation apparatus and is marked for determining relative positions of the sample and the sample base;

(b) reading the coordinates of the observation points using the coordinates of the second observation apparatus by removing the sample from the first observation apparatus and setting the sample in the second observation apparatus;

(c) determining coordinate transformation formulas by calculating coefficients a, b, c and d of formulas:

$$xn=aXn+bYn$$

$$yn=cXn+dYn$$

using an arbitrary one of the observation points as a temporary origin and correcting other observation points based on the temporary origin;

wherein:
Xn and Yn denote coordinates in the first observation apparatus; and
xn and yn denote coordinates in the second observation apparatus; and (d) transforming coordinates of the first observation apparatus into coordinates of the second observation apparatus by substituting the coordinates of the first observation apparatus into said coordinate transformation formulas and correcting values obtained thereby based on coordinates of the temporary origin.

4. An observation apparatus comprising:

a first observation apparatus that includes a first position determination unit employing a first coordinate system for specifying an observation position on a sample by coordinates;

a second observation apparatus that includes a second position determination unit employing a second coordinate system different from the first coordinate system;

a coordinate transformation unit that transforms the coordinates of the observation position specified by the first coordinate system into transformed coordinates of the second coordinate system; and a control device that controls the second position determination unit based on the transformed coordinates obtained from said coordinate transformation unit so as to specify the observation position on the sample;

wherein said coordinate transformation unit includes means for calculating the transformed coordinates of the second coordinate system using the coordinates of the observation position specified by said first observation apparatus, based on coordinate transformation formulas:

$$xn=aXn+bYn$$

$$yn=cXn+dYn$$

wherein:
a, b, c and d denote coefficients,
Xn and Yn denote coordinates in the first coordinate system; and
xn and yn denote coordinates in the second coordinate system.

* * * * *